US006584949B1

(12) United States Patent
Franchi et al.

(10) Patent No.: US 6,584,949 B1
(45) Date of Patent: Jul. 1, 2003

(54) WIRE GUIDE FOR ELECTRONICALLY CONTROLLED FUEL INJECTION SYSTEMS

(75) Inventors: Franco Franchi, Wood Dale, IL (US); Andrew D. Merrick, Lombard, IL (US); Kenneth R. Seymour, II, Villa Park, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 84 days.

(21) Appl. No.: 09/713,154

(22) Filed: Nov. 14, 2000

Related U.S. Application Data

(60) Provisional application No. 60/165,821, filed on Nov. 16, 1999.

(51) Int. Cl.[7] .............................. F02B 77/00; F16L 3/08

(52) U.S. Cl. ................................ 123/195 A; 174/72 A; 248/74.1; 123/195 E

(58) Field of Search ................................ 123/470, 456, 123/446, 468, 469, 195 A, 195 E; 248/68.1, 74.1, 71, 73, 74.4, 74.5, 74.2; 174/72 A

(56) References Cited

U.S. PATENT DOCUMENTS 4,029,277 A * 6/1977 Bulanda .................... 248/74.1
4,771,743 A * 9/1988 McDowell .............. 123/143 C
4,865,280 A * 9/1989 Wollar ....................... 248/68.1
5,035,637 A 7/1991 Mathews et al.
5,168,842 A * 12/1992 Brooks .................. 123/143 C
5,178,115 A 1/1993 Daly
5,211,149 A * 5/1993 DeGrace, Jr. ............... 123/470
5,390,648 A 2/1995 Yanase
5,551,150 A * 9/1996 Zielinski et al. .............. 29/882
5,567,184 A * 10/1996 Sasai et al. ................. 439/752
5,597,980 A 1/1997 Weber
5,607,318 A * 3/1997 Wakata et al. ............. 439/274
5,642,704 A 7/1997 Gogots et al.
5,709,559 A 1/1998 Fujitani et al.
5,771,850 A 6/1998 Okada
5,893,351 A 4/1999 Akutagawa et al.
6,068,048 A * 5/2000 Cude .......................... 165/125

* cited by examiner

*Primary Examiner*—Carl S. Miller
(74) *Attorney, Agent, or Firm*—Susan L. Lukasik; Dennis Kelly Sullivan; Jeffrey P. Calfa

(57) ABSTRACT

There is provided a wire guide for guiding and protecting wires from moving parts underneath the valve cover in a diesel engine. The wire guide has a channel portion connected to a base for securing the wire guide to the cylinder head. The base may be comprised of a retaining clip having two prongs that form an assembly that "snaps-on" to an injector clamp holder to secure the wire guide to the cylinder head. The channel portion is configured to cross a rocker arm when the wire guide is mounted on the cylinder head. The channel portion creates a conduit for holding the wires. The conduit is partially closed on at least one side and has an open side with intermittently spaced retaining tabs. The retaining tabs may be intermittently spaced as a series of pair tabs or alternating opposing singular tabs.

26 Claims, 9 Drawing Sheets

SECTION A-A

SECTION B-B

WIRE GUIDE FOR ELECTRONICALLY CONTROLLED FUEL INJECTION SYSTEMS

This patent application claims the benefit of Provisional U.S. patent application Ser. No. 60/165,821 filed on Nov. 16, 1999.

FIELD OF THE INVENTION

This invention relates generally to wiring systems for internal combustion engines. More particularly, this invention relates to wire guides for electronically controlled fuel injection systems in diesel engines.

BACKGROUND OF THE INVENTION

Many diesel engines have hydraulically-activated electronically-controlled unit injection (HEUI) fuel systems. In these systems, each injector has a solenoid for activating a poppet valve. The poppet valve regulates the flow of high pressure oil in the injector. The high pressure oil controls the fuel injection into the cylinder.

The engine's electronic control module transmits electrical signals to the solenoid via a connector in the valve cover. The connector also may be in the valve cover gasket, a valve fence, or part of the cylinder head. Under the valve cover, wires usually complete the circuit for transmitting signals from the electronic control module to the solenoids.

Generally, a pair of wires runs from the connector to each fuel injector. The pair of wires usually has a plug or a wire pigtail for connecting to the solenoid. The wires are positioned under the valve cover to avoid interference or entanglements with the rocker arms, valve rotators, and other moving parts. There may also be more than one pair of wires running from the connector to each fuel injector. Also, multiple connectors may be used to properly position the wires.

In a typical configuration, the connector is positioned between two fuel injectors. The connector may be placed on either the inboard or outboard side of the valve cover. From the connectors, wires run somewhat parallel to the valve cover before making almost perpendicular turns toward the fuel injectors to connect with the solenoids. In this manner, the wires avoid the rocker arms and other moving parts.

As alternatives to having wires under the valve cover, the wires or other types of conductors may be incorporated into the cylinder head, valve cover, or other parts. In one approach, the injectors are connected to electronics in or along the fuel rail. In a second approach, the wires are integral with the valve cover. The wires emerge underneath the valve cover at specific points for connecting to a particular injector. The wires emerge outside the valve cover to connect with the electronic control module. In a third approach, the wires lie along the inside surface of the valve cover. These wires have plugs at appropriate positions for connecting to the injectors when the valve cover is installed.

In other alternatives, the wires may be kept separated from the other parts underneath the valve cover. In one approach, wires are enclosed in a box or channel mounted on the fuel injection assembly. In a second approach, conductors are mounted in a connector block, which is mounted above the injectors. In a third approach, the wires are suspended on clips to keep the wiring above the injectors and other engine parts.

While these alternatives may provide suitable connections from the electronic control module to the injectors, they increase manufacturing costs and the assembly time of the engine. For example, incorporating the wires with the valve cover, fuel rail, or other engine parts increases the cost of those parts. It also increases the adverse impact of part failures. If the wire inside the valve cover or fuel rail does not operate, the valve cover or fuel rail must be replaced. This problem also increases maintenance costs because a new valve cover or fuel rail would be needed rather than replacement of a troublesome wire.

These alternatives also make assembly of the engine difficult. The plugs or connections on a valve cover or fuel rail must be aligned with the injectors before the cover or rail is secured in place. In some cases, it may be impossible to make the connections unless the wires have sufficient length. This "extra" length would be stored under the valve cover.

In addition, separating wires from other parts increases the space required under the valve cover. The height and width of the cylinder head and valve cover have to increase to accommodate a box or channel for the wires. Alternatively, a valve fence could be used, but it would increase the number of parts required. The height also has to increase for wires suspended on a clip above the injectors.

In comparison to the alternatives, wires routed in the available spaces underneath the valve cover make an engine easier to manufacture and cost less. However, using wires underneath the valve cover is difficult in a new HEUI fuel system. Improvements in HEUI fuel systems use fuel injectors with multiple solenoids. Usually, there are two solenoids on opposite sides of the injector. The solenoids control a spool valve in the injector. Each solenoid requires its own pair of wires (or a single wire if an alternate ground connection is used).

As opposed to facing the rocker arms, the fuel injectors are installed with one solenoid facing the side of the valve cover or fence. The other solenoid faces the valve rotators. One pair of wires runs somewhat parallel to the valve cover before making an almost perpendicular turn toward the fuel injector to connect with the solenoid. The wires have a straightforward run between the rocker arms. However, to reach the solenoid on the other side of the injector, the other pair of wires must cross the rocker arms or curve dangerously around the valve rotators. In either position, these wires interfere with or become entangled in the moving parts.

Going over the injector top is not an option. The high pressure oil rail sits upon and spans the top of the injectors. While wires may be routed on top or along the oil rail, they need to be secured in some manner so as not to move during engine operation. Tie bands and other securing means may be used. However, they increase manufacturing time and may not keep the wires from moving along the oil rail as the engine vibrates.

Accordingly, there is a need for guiding wires underneath the valve cover of a diesel engine so the wires do not interfere or become entangled with moving parts.

SUMMARY OF THE INVENTION

The present invention provides a wire guide for guiding and protecting wires from moving parts underneath the valve cover in a diesel engine. The wire guide has a channel portion connected to a base. The channel portion is configured to cross a rocker arm when the wire guide is mounted on the cylinder head.

The base has a main support connected to a side support and a foot section. A pedestal extends from the foot section to assist mounting on the cylinder head. The foot section and pedestal form a bore for securing the wire guide to the cylinder head with a bolt.

The channel portion creates a conduit for holding the wires. The conduit is essentially closed on two sides and partially closed on the bottom side, which has alternating cross-supports and open spaces, or simply intermittently spaced cross-supports. The top side is an open side, but constrained intermittently by pairs of retaining tabs.

The retaining tabs form along the top of the channel portion. They each have a tapered face, which has an upper edge and a lower edge. The upper edge helps to form the top side of the channel portion. The lower edge helps define the conduit. In a pair of retaining taps, the distance between the lower edges is less then the distance between the upper edges. This configuration creates an inverted wedge-shaped opening between the retaining tabs. Tapered faces and a wedged-shaped opening make it easier to push and retain wires in the conduit. In an alternate embodiment, the base is comprised of a retaining clip section that extends away from a side of the channel portion to assist in mounting the channel guide to the cylinder head. The retaining clip section is comprised of two prongs forming a snap-on assembly that "snaps" onto the injector clamp that holds the injector in place. The snap-on assembly secures the wire guide to the cylinder head.

In this embodiment, the conduit may be partially or completely closed on three sides. There is an open fourth side that is constrained intermittently by alternating and opposing retaining tabs. The retaining tabs form along the open side of the channel portion in an alternating and opposing fashion creating a series of alternating retaining tabs and open spaces along the channel portion. In use, the wires from the connectors pass through the wire guide. The wire guide crosses the rocker arms thereby keeping the wires from interfering and becoming entangled in the rocker arms and other moving parts.

The following drawings and description set forth additional advantages and benefits of the invention. More advantages and benefits are obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
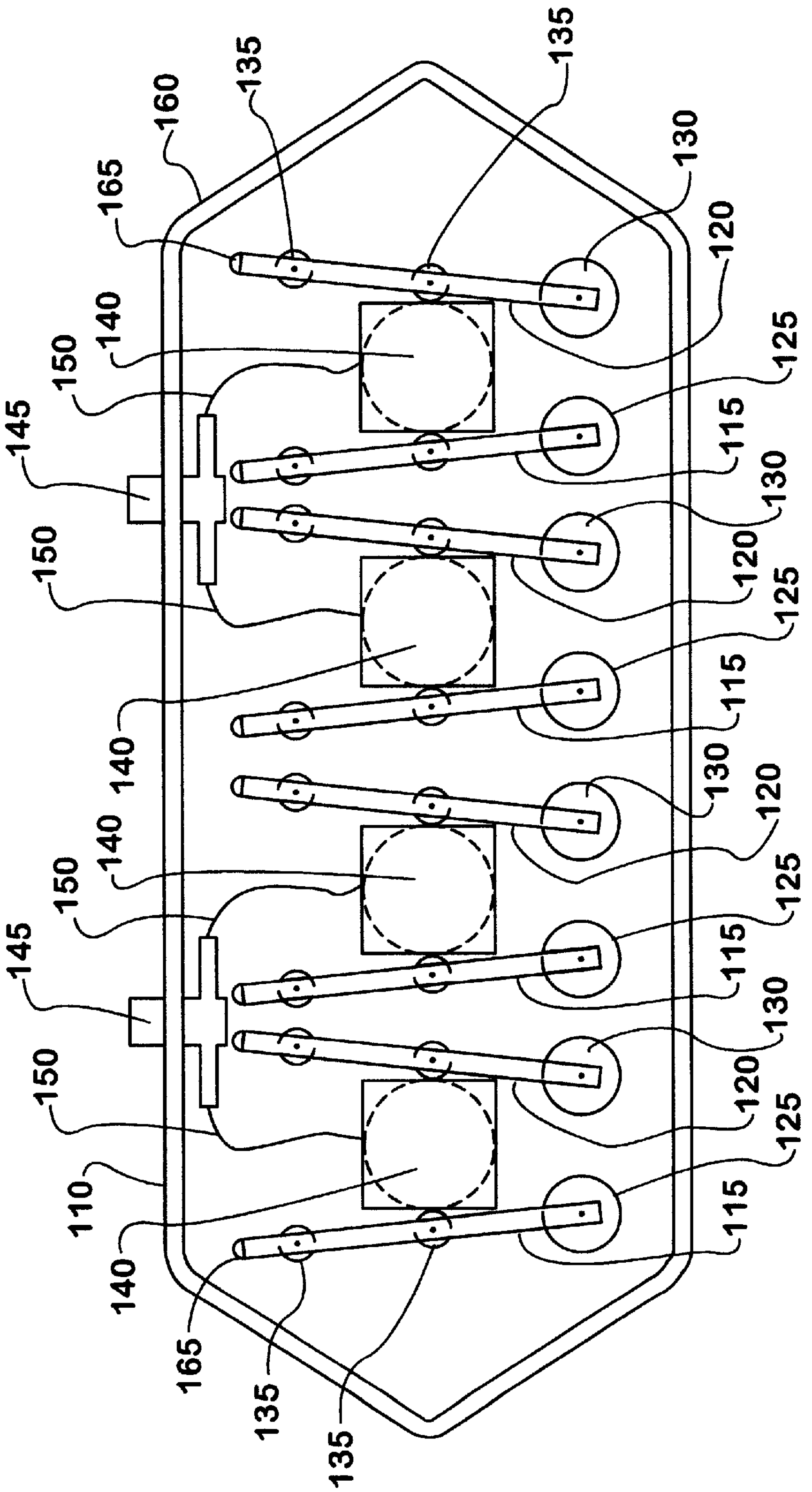
FIG. 1 PRIOR ART
FIG. 1 is a top view of a cylinder head according to the prior art.

FIG. 1 shows a cylinder head 110 with the valve cover (not shown) removed according to the prior art. The cylinder head 110 has a gasket 160 for joining to the valve cover. Within the cylinder head 110, fuel injectors 140 are positioned to inject fuel into the cylinders (not shown). Rocker arms 115 are mounted on pedestals 135 adjacent to the fuel injectors 140. Push rods (not shown) engage the rocker arms 140 at valve lashes 165. The push rods rotate the rocker arms 140 to depress the intake valve rotators 125 and exhaust valve rotators 130 at the appropriate times. The valve rotators 125, 130 actuate the engine valves (not shown).

The gasket 160 has connectors 145 for passing electrical contacts (not shown) through the gasket 160. The connectors 145 are shown located in the outboard side of the engine. Outside the valve cover, the connectors 145 connect to the engine's electronic control module (not shown). Inside the valve cover, pairs of wires run from the connectors 145 to the fuel injectors 140. For each fuel injector 140, a pair of wires 150, or more than one pair of wires in some cases, run essentially parallel to the valve cover 110 before turning perpendicular to run between the rocker arms 115 for connection with the solenoid (not shown) on the fuel injector 140. The pair of wires 150 may have a plug (not shown) for attaching to the solenoid.

Figure 2:
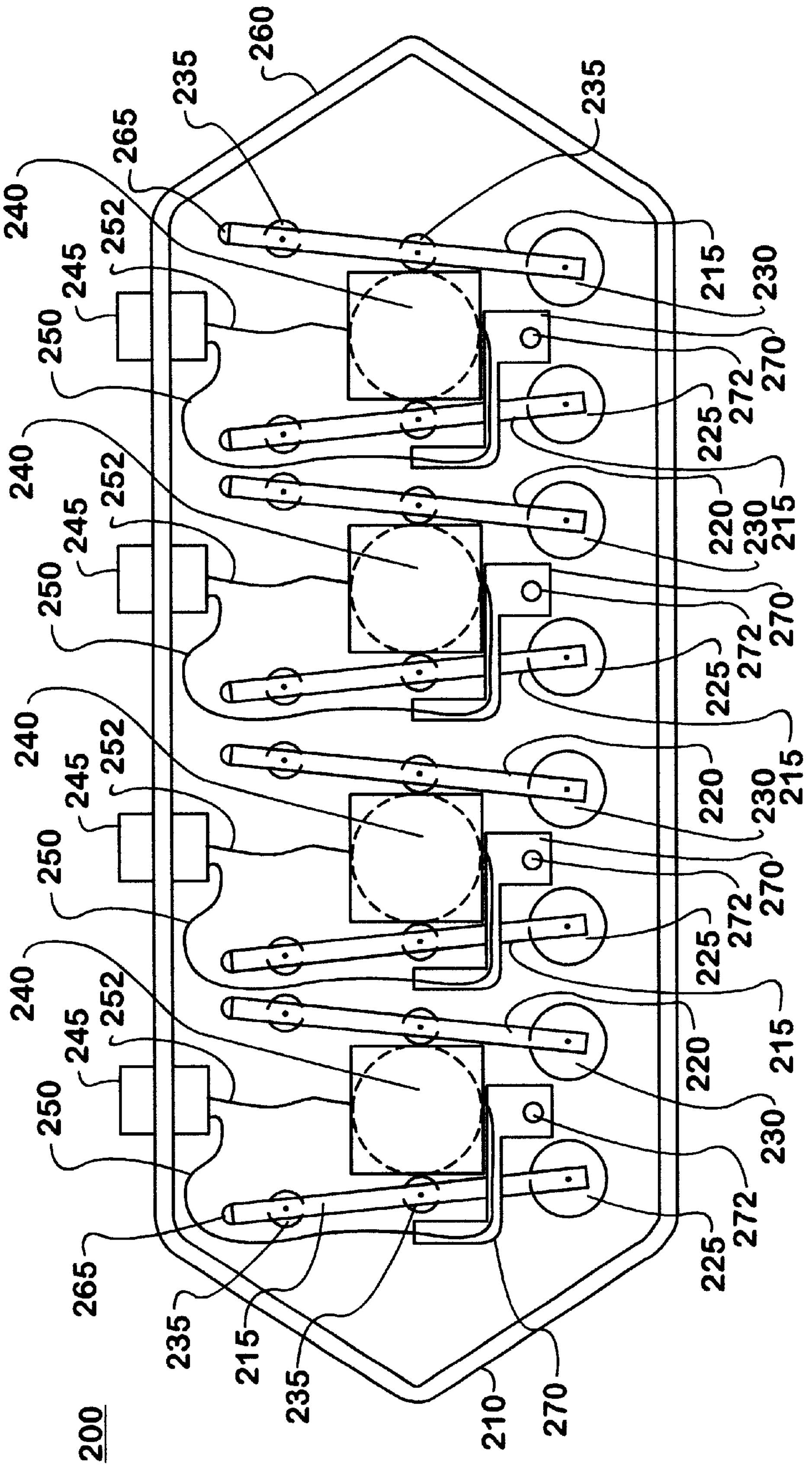
FIG. 2 is a top view of a cylinder head with a first embodiment of the wire guide of the present invention in use.

FIG. 2 shows a cylinder head 210 with the valve cover (not shown) removed according to the present invention. The cylinder head 210 has a gasket 260 for joining to the valve cover. Within the cylinder head 210, fuel injectors 240 are positioned to inject fuel into the cylinders (not shown). Each fuel injector 240 has a first solenoid (not shown) and a second solenoid (not shown). Rocker arms 215 are mounted on pedestals 235 adjacent to the fuel injectors 240. Push rods (not shown) engage the rocker arms 240 at valve lashes 265. The push rods rotate the rocker arms 215 to depress intake valve rotators 225 and exhaust valve rotators 230 at the appropriate times. The valve rotators 225, 230 actuate the engine valves (not shown).

The gasket 260 has connectors 245 for passing electrical contacts (not shown) through the gasket 260. Although the connectors 245 are shown passing through the gasket 260, the connectors 245 may be in the valve cover, a valve fence, or another part of the cylinder head 210. For example, the connectors 245 shown in FIG. 2 are physically located on the outboard side of the engine or cylinder head 210. But, the connector may be placed on either the inboard or outboard side of the valve cover. While multiple connectors 245 are shown, any number of connectors 245 including a single connector 245 may be used.

Outside the valve cover, the connectors 245 connect to the engine's electronic control module (not shown). Inside the valve cover, at least one pair of wires 250, 252 runs from the connectors 245 to the fuel injectors 240. FIG. 2 shows each fuel injector 240 is connected to the connectors 245 by a first pair of wires 250 and a second pair of wires 252. However, there may be more or less pairs of wires 250 and 252 connecting the connector 245 and fuel injectors 240. While the wires are described as pairs, single or multiple wires may be used for additional control of the solenoids. A single wire also may also be used if another grounding means is provided. In addition, each pair of wires 250, 252 may have a plug (not shown) for attaching to the solenoids.

The first pair of wires 250 runs essentially parallel to the valve cover 210 before turning perpendicular to run parallel to rocker arm 215 on the side opposite the fuel injector 240. As the first pair of wires 250 nears the valve rotators 225, 230, the first pair of wires 250 enters a wire guide 270 before crossing the rocker arm 215. After crossing the rocker arm 215, the first pair of wires 250 exits the wire guide 270 and connects to the first solenoid on the fuel injector 240. The wire guides 270 are preferably mounted on the cylinder head 210 by bolts 272. However, those of skill in the art will recognize that other means, such as an adhesives, clips, and similar devices, may be used to mount the wire guides 270 to the cylinder head 210.

The second pair of wires 252 runs between the rocker arms 215 for connection with the second solenoid in the fuel injector 240. In the embodiment of FIG. 2, the connectors 245 are positioned for the second pairs of wires 252 to have essentially unobstructed runs to the fuel injectors 240. If the connectors 245 were in different positions or different in number, one or more of the second pairs of wires 252 would run parallel to the valve cover before turning perpendicular to run between the rocker arms 215.

Figure 3:
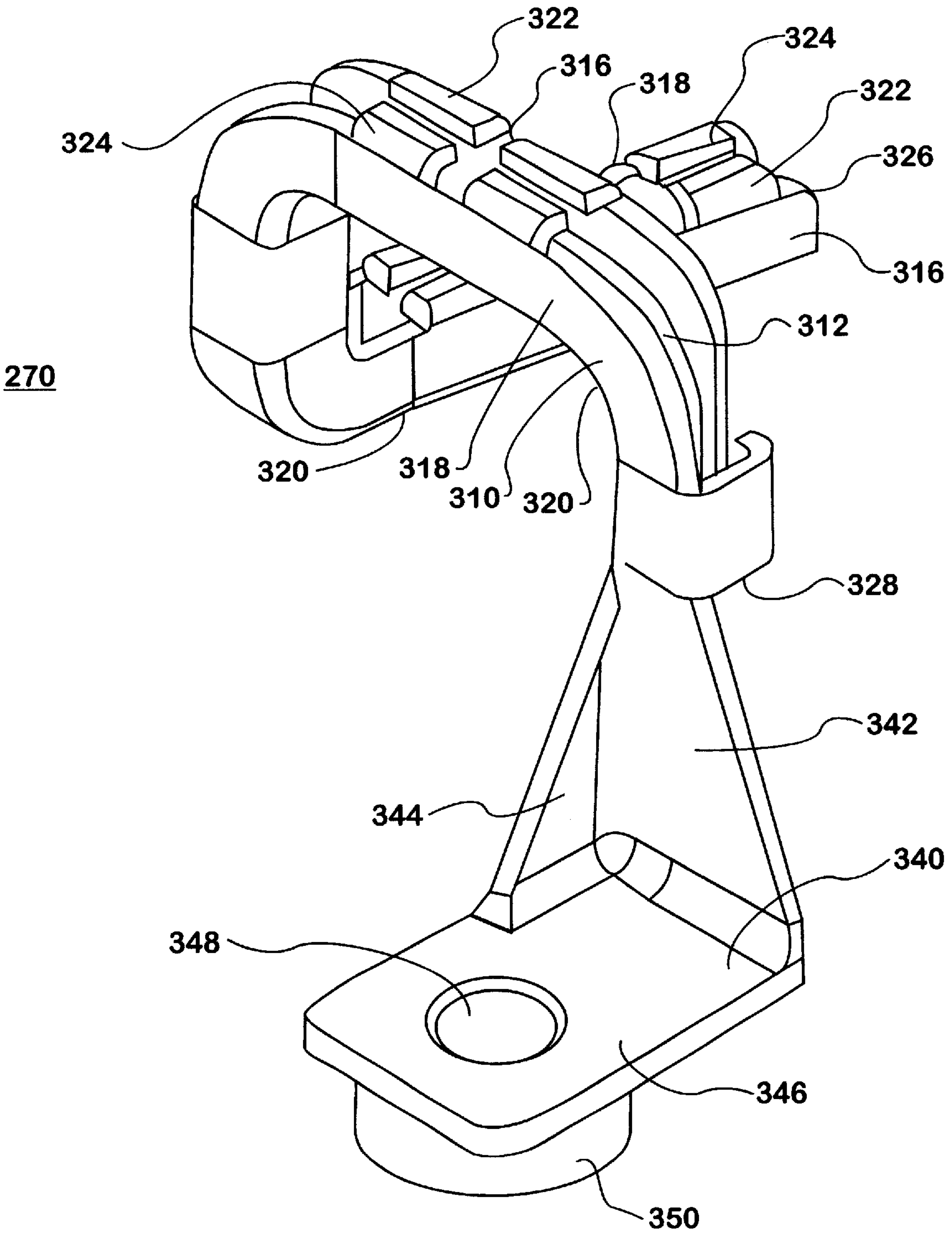
FIG. 3 is a perspective view of the first embodiment of the wire guide of the present invention.
Figure 4:
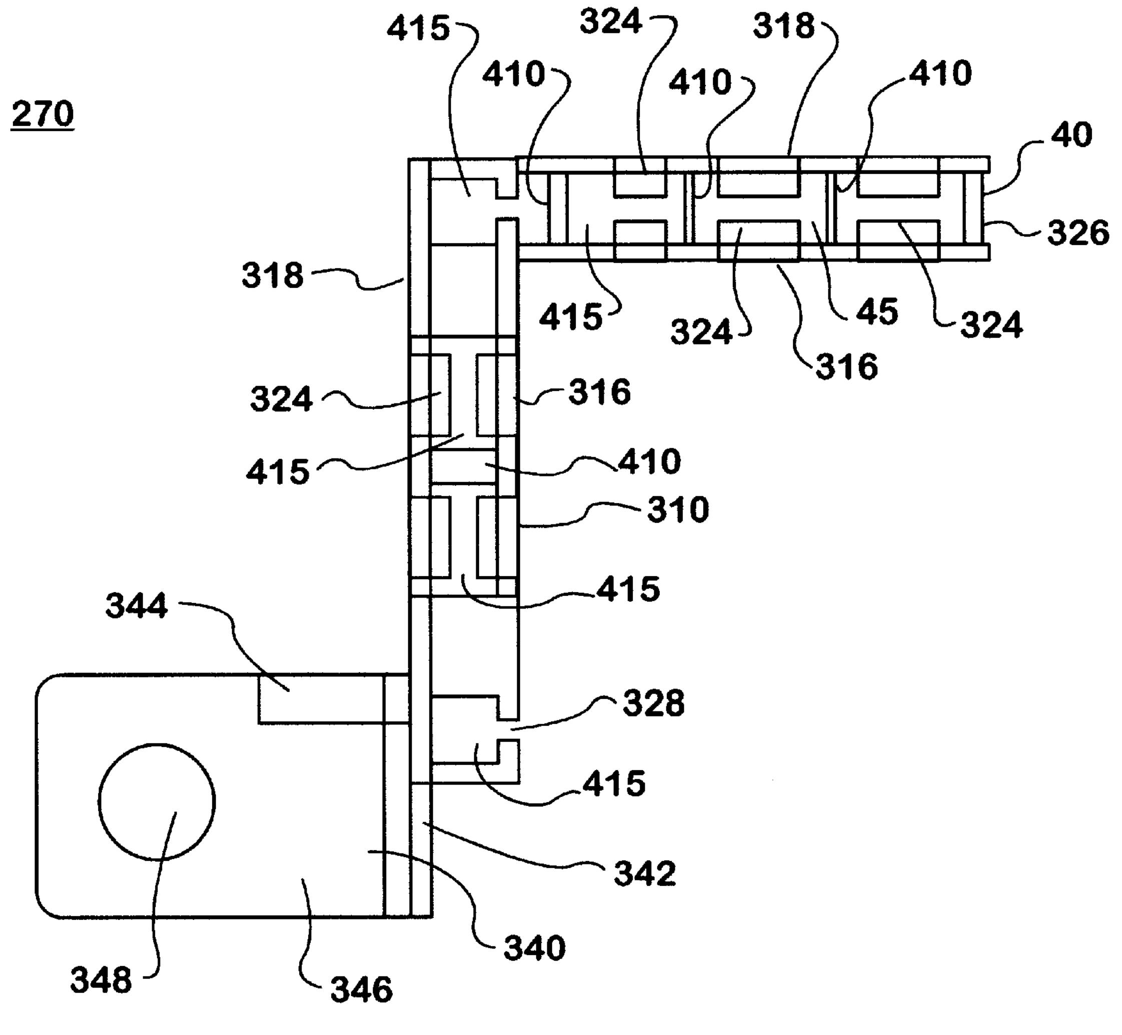
FIG. 4 is a top view of the first embodiment of the wire guide of the present invention.
Figure 5:
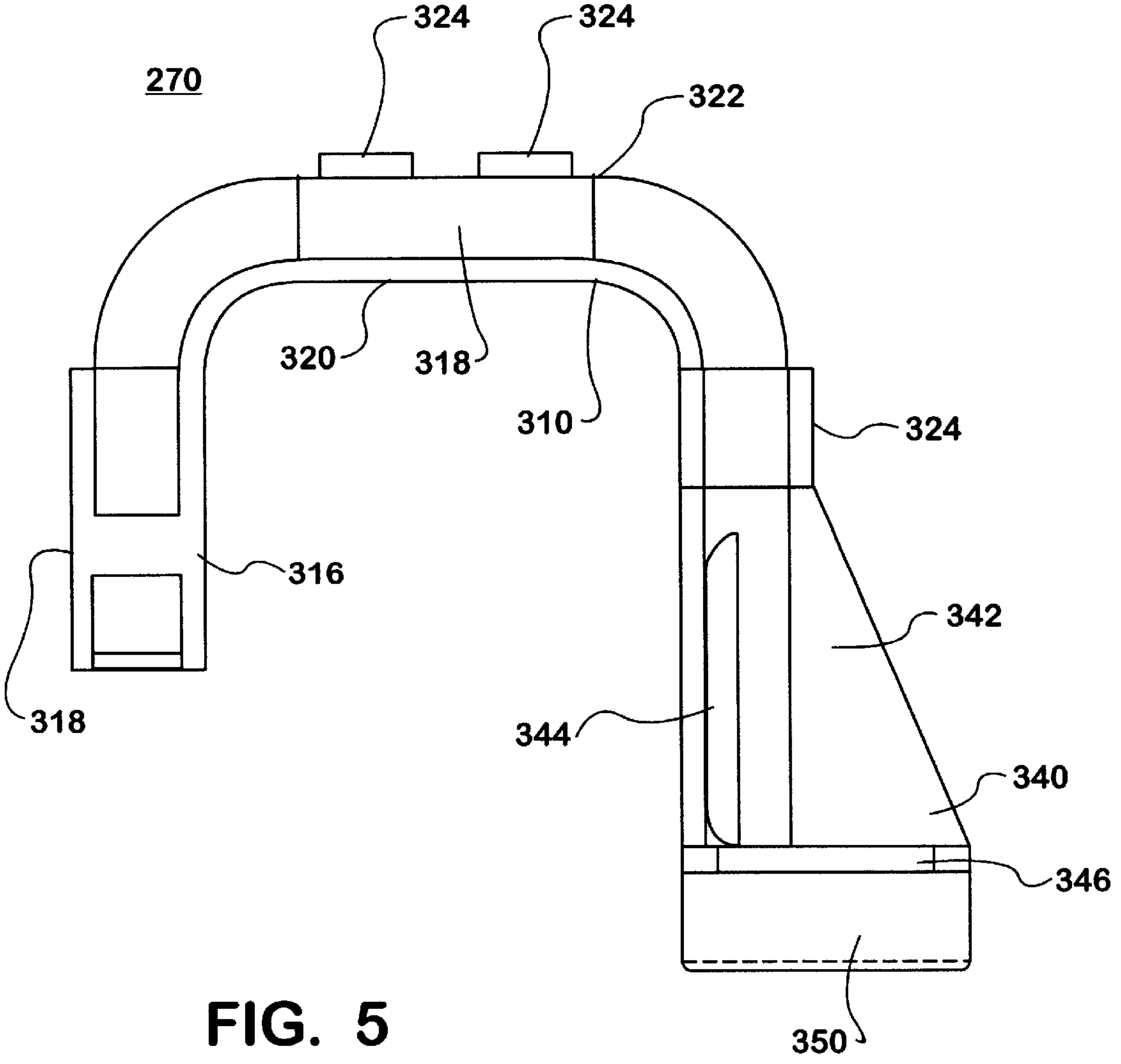
FIG. 5 is a rear view of the first embodiment of the wire guide of the present invention.
Figure 6:
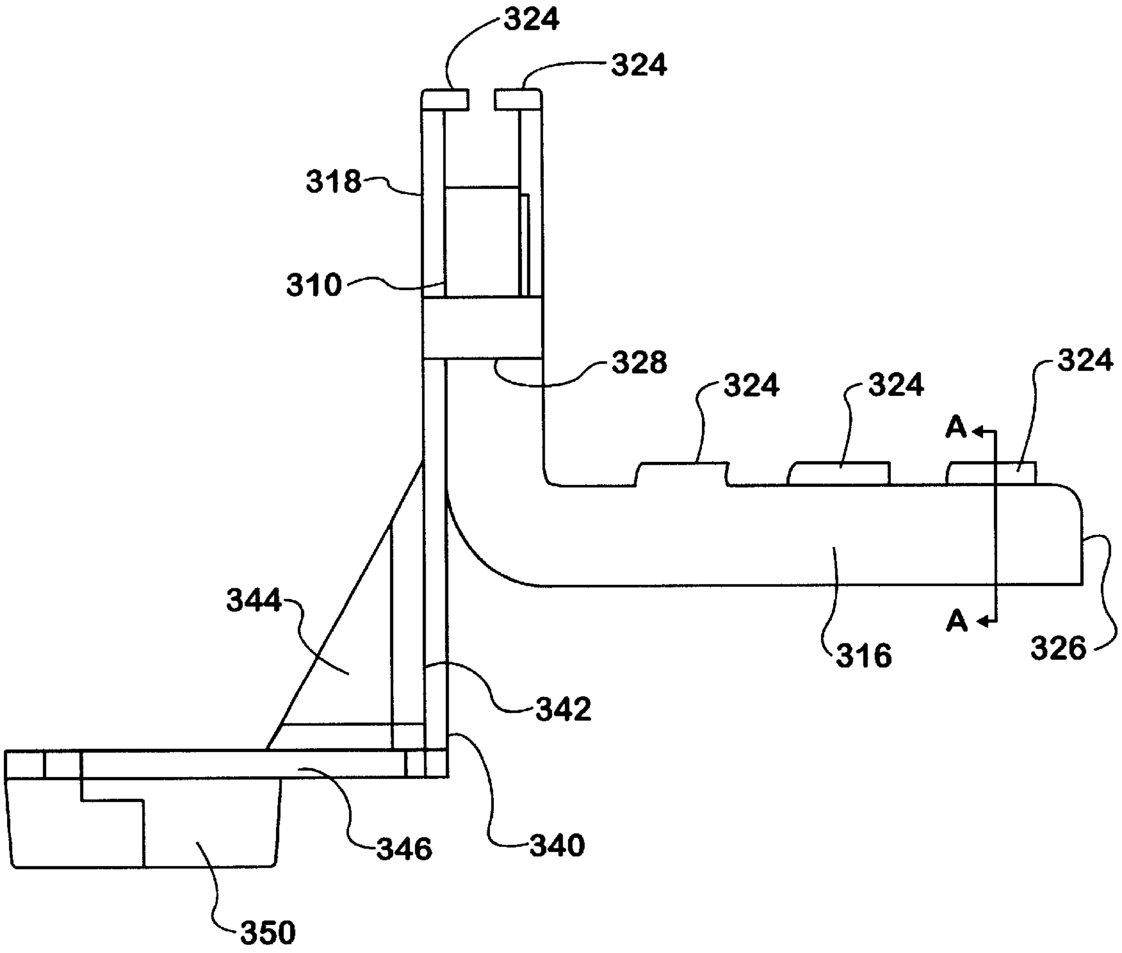
FIG. 6 is a side view of the first embodiment of the wire guide of the present invention.

FIG. 3 shows a perspective view of a first embodiment of the wire guide 270 according to the present invention. FIGS. 4–6 show the top, back, and side views respectively of the first embodiment of the wire guide 270 shown in FIG. 3. The wire guide 270 has a channel portion 310 connected to a base 340. The channel portion 310 is configured to cross the rocker arm 215 without interfering with it once the wire guide 270 is mounted on the cylinder head 210. While one preferred configuration of the channel portion 310 is shown in FIGS. 3–6, the channel portion 310 may be configured in numerous ways to cross the rocker arm 215, including crossing underneath it.

The channel portion 310 creates a conduit 312 formed by sides 316, 318, bottom 320, and top 322. The channel portion 310 also forms a first opening 326 and a second opening 328. The top is an open side 322 and is preferably constrained by retaining tabs 324. The bottom side 320 is preferably partially solid having cross supports 410 and open spaces 415, or simply intermittently spaced cross-supports. However, the bottom side 320 may also be completely solid. The sides 316, 318 are preferably solid, but may also be partially solid or closed by having intermittently spaced cross-supports. The cross-support may also be perpendicular or angled relative to the sides they lie between.

The top open side 322, bottom side 320, and sides 316, 318 are labeled relative to the orientation of the wire guide 270 shown in FIG. 3. For example, side 316 "becomes" the top 322 due to the configuration of the wire guide 270. Similarly, the bottom 320 "becomes" the side 316.

The base 340 has a main support 342 connecting the channel portion 310 to a foot section 346. A side support 344 is connected perpendicular to the main support 342 and the foot section 346. The foot section 346 has a pedestal 350 for mounting on the cylinder head 210. Both the foot section 346 and the pedestal 350 form a bore 348 for securing the wire guide 270 to the cylinder head 210 using bolt 272. The pedestal 350 may form one or more prongs (not shown) to prevent the wire guide 270 from rotating on the cylinder head 210.

Figure 7:
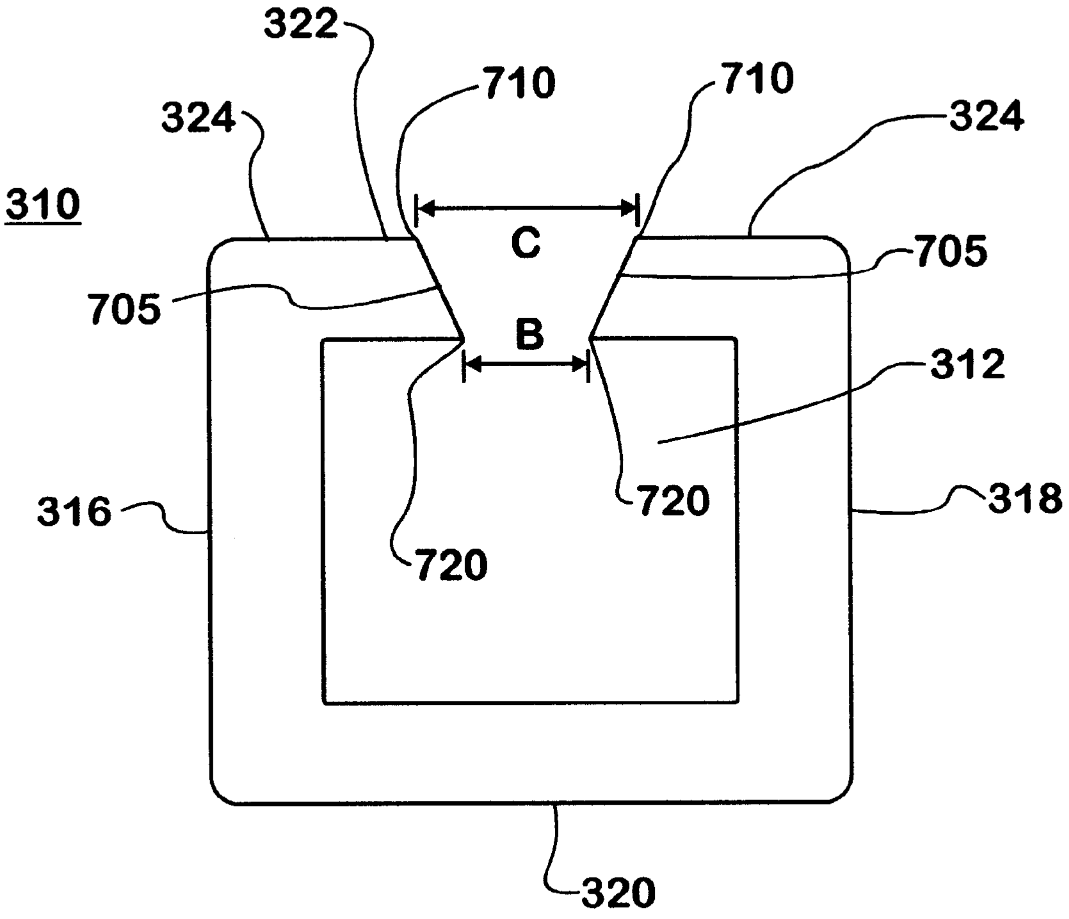
FIG. 7 is a cross-sectional view along the line A—A of the wire guide depicted in FIG. 6.

FIG. 7 shows a section view along the line A—A of the wire guide shown in FIG. 6. This is a cross-sectional view of the channel portion 310 at a pair of retaining tabs 324. The retaining tabs 324 work in pairs and are preferably formed adjacently to each other along the top 322 at intermittent positions. Each retaining tab 324 has a face 705, having an upper edge 710 and a lower edge 720. The upper edge 710 helps form the top 322 of the channel portion 310. The lower edge 720 helps define the conduit 312. The faces 705 are preferably tapered such that distance B, the distance between the lower edges 720, is less than distance C, the distance between the upper edges 710. The tapered faces 705 make it easier to push wires into and retain wires in conduit 312.

Figure 8:
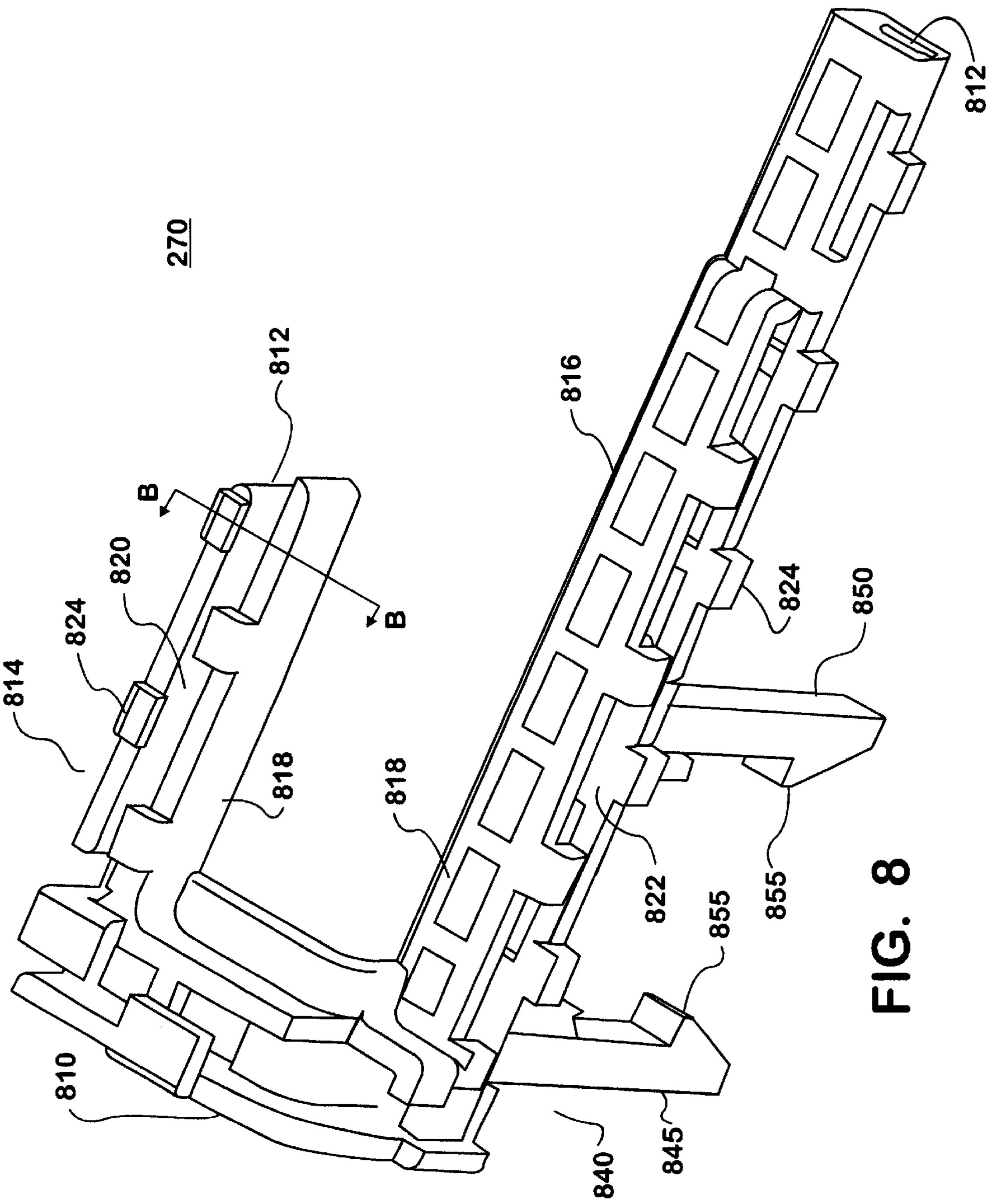
FIG. 8 is a perspective view of a second embodiment of the wire guide of the present invention.

FIG. 8 shows a second embodiment of the present invention that is preferably used when the connectors 245 are located on the inboard side of the engine or cylinder head 210 (not shown). The second embodiment of the wire guide 270 preferably has a U-shaped channel portion 810 connected to a base 840. The channel portion 810 is configured to cross the rocker arm 215 without interfering with it once the wire guide 270 is mounted on the cylinder head 210. The channel portion 810 may also be configured in numerous ways to cross the rocker arm 215, including crossing underneath it.

The channel portion 810 can be viewed as being comprised of a first leg 814 and a second leg 816 that together create a U-shaped wire conduit 812. The second leg 816 is preferably longer than the first leg 814. However, the leg 814 and 816 lengths can vary depending on the requirements of a particular engine application. The first leg 814 and second leg 816 each have three sides 818 that may be completely or partially solid. When partially solid or closed, the three sides 818 have intermittently spaced cross-supports (also shown in FIG. 3). The cross-support may be perpendicular or angled relative to the sides 818 they lie between. The fourth side 818 of the first leg 814 and second leg 816 is an open side and preferably forms a first leg opening 820 and a second leg opening 822 respectively.

The first leg opening 820 and second leg opening 822 are constrained by intermittent retaining tabs 824. The retaining tabs 824 are preferably placed on alternating and opposite sides of the leg openings 820 and 822 so as not to be directly across from each other. However, retaining tabs may also be arranged as intermittently spaced retaining tab pairs. For example, like the retaining tab pairs shown and discussed with reference to FIGS. 3–7. Thus, in this second embodiment, the retaining tabs 824 are preferably formed in an alternating and opposing arrangement along the leg openings 820 and 822 at intermittent positions.

The base 840 is preferably a retaining clip section comprised of a first prong 845 and a second prong 850. The retaining base clip section 840 will secure the wire guide to the cylinder head by snapping onto the injector clamp which holds the injector in place. The retaining base clip section 840 first and second prongs 845 and 850 are preferably attached to a side 818 of the second leg 816 and together extend away from the second leg 816. The retaining clip first and second prongs 845 & 850, comprising a first and second retaining tooth 855 respectively, cooperatively "snap-on" or clip on to the injector clamp to secure the wire guide to the cylinder head 210.

Figure 9:
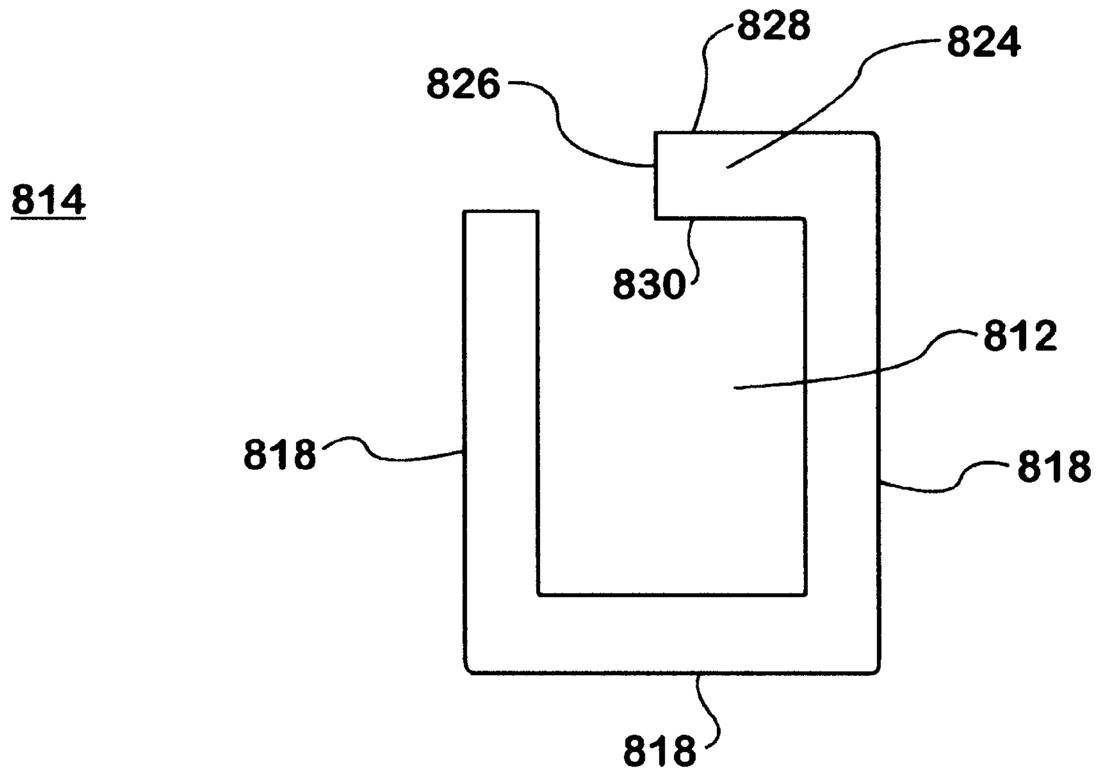
FIG. 9 is a cross-sectional view along the line B—B of the wire guide depicted in FIG. 8.

FIG. 9 shows section view along the line B—B of the wire guide shown in FIG. 8. This is a representative cross-sectional view of the channel portion 810 at one of the retaining tabs 824 on one side of the leg opening 820 or 822. Each retaining tab 824 has a face 826, having an upper edge 828 and a lower edge 830. The upper edge 828 helps form the top of the channel portion 810. The lower edge 830 helps define the conduit 812. The face 826 is shown vertically flat but may also be tapered, as shown in FIG. 7, to make it easier to push wires into and retain wires in the wire conduit 835.

In addition to protecting and guiding wires from moving parts, the wire guide 270 makes the assembly of the fuel injection system easier and faster. The wire guide 270 may be pre-assembled with the pair of wires 250 and other parts of the fuel injection system. For example, the connector 245, the wire guide 270, and the pairs of wires 250, 252 along with plugs for connecting to the solenoids may be pre-assembled.

During assembly of the fuel injector system, each fuel injector 240 and its associated rocker arms 215 are installed as appropriate on the cylinder head 210. The appropriate wire guide 270 is mounted on the cylinder head 210 using the securing bolt 272 or by "snapping" the wire guide securely into place on the injector hold down clamp. The appropriate wires or pair of wires 250 are plugged into a first solenoid on the fuel injector 240. The appropriate first pair of wires 250 is then routed around the rocker arm 215. The connector 245 is installed in the valve cover, valve fence, or other part. The appropriate second pair of wires 252 is then routed and connected to the second solenoid on fuel injector 240.

The wire guide 270 may also be pre-assembled with other combinations of parts. The wire guide 270 may have numerous shapes and configurations as long as they are suitable for guiding and protecting the wires from moving parts in the cylinder head 210 area. The wire guide 270 may also be mounted at other locations on the cylinder head depending on where the connectors 245 are located on the cylinder head 210.

The present invention has been described and illustrated by way of certain examples of preferred embodiments only. Additional advantages will be readily apparent to those skilled in the art, who may modify the embodiments without departing from the true spirit and scope of the invention. Therefore, this invention is not limited to the specific details, representative devices, and illustrated examples in this description. The present invention is limited only by the following claims and equivalents.

We claim:

1. A wire guide for use in an engine, the wire guide comprising:

a) a channel portion having an open side with intermittently spaced retaining tabs, wherein the channel portion comprises at least two members forming at least one bend; and b) a base connected to the channel portion, the base configured such that the wire guide can be secured to a cylinder head;

c) whereby wires are guided and protected from moving parts underneath a valve cover in an engine.

2. The wire guide of claim 1, wherein the channel portion and the base are connected by a support section, the support section comprising:

a) a main support connected to a side support;

b) a foot section connected to the side support; and c) a pedestal extending away from the foot section.

3. The wire guide of claim 2, wherein the foot section and pedestal form a bore for securing the wire guide to the cylinder head with a bolt.

4. The wire guide of claim 1, wherein the base is secured to the cylinder head via a bolt, an adhesive, or a clip.

5. The wire guide of claim 1, wherein the channel portion has at least one partially closed side comprised of intermittent cross-supports.

6. The wire guide of claim 1, wherein the retaining tabs are formed as a series of tab pairs along the open side of the channel portion.

7. The wire guide of claim 1, wherein the retaining tabs comprise:

a) a tapered face;

b) an upper edge that forms an outer edge of the channel portion; and c) a lower edge that defines a conduit.

8. The wire guide of claim 7, wherein the tab pair defines a) a first distance between the upper edges of the tab pair; and b) a second distance between the lower edges of the tab pair wherein the first distance is larger than the second distance;

c) whereby the tab pair results in an inverted wedge-shaped opening between the retaining tab pair.

9. A wire guide for use in an engine, the wire guide comprising:

a) a channel portion having an open side with intermittently spaced retaining tabs, wherein the channel portion comprises at least two members forming at least one bend; and b) a base connected to the channel portion;

c) whereby the wire guide can be secured to a cylinder head such that wires are guided and protected from moving parts underneath a valve cover in an engine.

10. The wire guide of claim 9, wherein the retaining tabs are formed as a series of alternating opposing tabs along the open side of the channel portion.

11. The wire guide of claim 9, wherein the base is comprised of a first prong with a first retaining tooth and a second prong with a second retaining tooth whereby the base snaps-on to an injector clamp holder.

12. The wire guide of claim 9, wherein the channel portion has at least one partially closed side comprised of intermittent cross-supports.

13. The wire guide of claim 9, wherein the retaining tabs further comprise:

a) a tapered face;

b) an upper edge that forms an outer edge of the channel portion; and c) a lower edge that defines a conduit.

14. The wire guide of claim 9, wherein the channel portion is configured in a u-shape with a first leg and second leg.

15. The wire guide of claim 14, wherein the base extends away from the second leg.

16. The wire guide of claim 9, wherein the retaining tabs are formed as a series of tab pairs along the open side of the channel portion.

17. A wire guide for use in an engine, the wire guide comprising:

a channel having at least one open side, wherein a first plurality of retaining tabs are intermittently spaced on a first edge of the open side and a second plurality of retaining tabs are intermittently spaced on a second edge of the open side, such that at least one wire is guided within the channel;

a base connected to the channel portion;

wherein the wire guide protects the at least one wire from moving parts underneath a valve cover in the engine.

18. The wire guide of claim 17, wherein the base is securable to a cylinder head.

19. The wire guide of claim 17, wherein the channel has at least one partially closed side comprised of intermittent cross-supports.

20. The wire guide of claim 17, wherein the first and second plurality of retaining tabs comprise a plurality of tab pairs intermittently spaced along the at least one open side of the channel.

21. The wire guide of claim 17, wherein at least some of the first and second plurality of retaining tabs further comprise:

a tapered face;

an upper edge that forms an outer edge of the channel portion; and a lower edge that defines a conduit.

22. The wire guide of claim 17, wherein the channel and the base are connected by a support section, the support section comprising:

a main support connected to a side support;

a foot section connected to the side support; and a pedestal extending away from the foot section.

23. The wire guide of claim 17, wherein the channel comprises at least two member forming at least one bend.

24. The wire guide of claim 17, wherein the retaining tabs are formed as a series of alternating opposing tabs along the open side of the channel portion.

25. The wire guide of claim 17, wherein the base is comprised of a first prong with a first retaining tooth and a second prong with a second retaining tooth whereby the base snaps-on to an injector clamp holder.

26. The wire guide of claim 17, wherein the channel portion is configured in a U-shape with a first leg and second leg.

* * * * *